United States Patent
Vishal et al.

(10) Patent No.: US 11,132,577 B2
(45) Date of Patent: Sep. 28, 2021

(54) SYSTEM AND A METHOD FOR EFFICIENT IMAGE RECOGNITION

(71) Applicant: Cognizant Technology Solutions India Pvt. Ltd., Chennai (IN)

(72) Inventors: Kumar Vishal, Benares (IN); Ritesh Mishra, Bengaluru (IN); Arvind Channarayapatna Srinivasa, Bengaluru (IN); Venugopal Gundimeda, Hyderabad (IN)

(73) Assignee: COGNIZANT TECHNOLOGY SOLUTIONS INDIA PVT. LTD, Chennai (IN)

( * ) Notice: Subject to any disclaimer, the term of this patent is extended or adjusted under 35 U.S.C. 154(b) by 115 days.

(21) Appl. No.: 16/569,804

(22) Filed: Sep. 13, 2019

(65) Prior Publication Data
US 2021/0019547 A1  Jan. 21, 2021

(30) Foreign Application Priority Data
Jul. 17, 2019 (IN) .............................. 201941028755

(51) Int. Cl.
*G06K 9/46* (2006.01)
*G06F 16/583* (2019.01)
*G06K 9/00* (2006.01)

(52) U.S. Cl.
CPC ............ *G06K 9/46* (2013.01); *G06F 16/583* (2019.01); *G06K 9/00684* (2013.01); *G06K 9/00825* (2013.01)

(58) Field of Classification Search
CPC .. G06K 9/46; G06K 9/00684; G06K 9/00825; G06F 16/583
See application file for complete search history.

(56) References Cited

U.S. PATENT DOCUMENTS

| 8,843,424 | B2 * | 9/2014 | Mei ...................... G06K 9/6257 706/20 |
| 8,948,500 | B2 | 2/2015 | Chen |
| 8,971,581 | B2 | 3/2015 | Wu |

(Continued)

OTHER PUBLICATIONS

Alex D. Pon, "A Hierarchical Deep Architecture and Mini-Batch Selection Method For Joint Traffic Sign and Light Detection", 2018, URL: https://arxiv.org/abs/1806.07987.

(Continued)

*Primary Examiner* — John B Strege
(74) *Attorney, Agent, or Firm* — Cantor Colburn LLP (57) ABSTRACT

A system and method for for grouping of similar image classes for image recognition is provided. The invention comprises extracting one or more features from multiple classes of images for determining a correlation value between each of the multiple classes of images based on assessment of the extracted features of each one of the classes of images with respect to other classes of images in the multiple classes of images. Further, the one class of image is grouped with the other class of image in the multiple classes of images to form one or more groups of super-classes of similar class of images based on analysis of the determined correlation values with respect to a pre-determined threshold value. An input image is recognized based on the formed groups of super-classes followed by sub-class classification of the images.

19 Claims, 4 Drawing Sheets

(56) References Cited

U.S. PATENT DOCUMENTS

| | | |
|---|---|---|
| 9,224,071 B2 | 12/2015 | Tu |
| 2016/0012307 A1 | 1/2016 | Morishita |
| 2016/0117587 A1 | 4/2016 | Yan |
| 2019/0050691 A1* | 2/2019 | Lee ............... G06K 9/6211 |

OTHER PUBLICATIONS

Alexander Wong, "MicronNet: A Highly Compact Deep Convolutional Neural Network Architecture for Real-time Embedded Traffic Sign Classification", 2018, URL: https://www.google.com/url?sa=t&rct=j&q=&esrc=s&source=web&cd=18&ved=2ahUKEwi7nc6NkerdAhUQf30KHT-7C6wQFjARegQICRAC&url=https%3A%2F%2Farxiv.org%2Fpdf%2F1804.00497&usg=AOvVaw1v9H7vTzouu3d-HbpTKRhV.

Atul Laxman Katole, "Hierarchical Deep Learning Architecture for 10K Objects Classification", 2015, URL: https://www.google.com/url?sa=t&rct=j&q=&esrc=s&source=web&cd=2&ved=2ahUKEwiC1M2DqrrdAhURSI8KHftGCbkQFjABegQICRAC&url=https%3A%2F%2Farxiv.org%2Fpdf%2F1509.01951&usg=AOvVaw0zWA3IYK6FbQHxP78I3KaG.

Chung Yu Wang, "Traffic Sign Detection using You Only Look Once Framework", Course Project Reports: Winter 2016—Stanford University URL: https://www.google.com/url?sa=t&rct=j&q=&esrc=s&source=web&cd=15&ved=2ahUKEwi7nc6NkerdAhUQf30KHT-7C6wQFjAOegQIBBAC&url=http%3A%2F%2Fcs231n.stanford.edu%2Freports%2F2016%2Fpdfs%2F263_Report.pdf&usg=AOvVaw0RvGnn9Dbit-_INHxZ88c6.

Erjin Zhou, "Extensive Facial Landmark Localization with Coarse-to-fine Convolutional Network Cascade", 2013, URL: https://www.google.com/url?sa=t&ret=j&q=&esrc=s&source=web&cd=2&ved=2ahUKEwiV2Na1ie_dAhUGSX0KHT9gD-sQFjABegQICBAC&url=http%3A%2F%2Fopenaccess.thecvf.com%2Fcontent_iccv_workshops_2013%2FW11%2Fpapers%2FZhou_Extensive_Facial_Landmark_2013_ICCV_paper.pdf&usg=AOvVaw3HBSuwSzVoVsVnF57ID0SO.

Sandeep Rai. "Recognition and Classification of Traffic Signs using Machine Learning Techniques", International Journal of Computer Applications (0975-8887) vol. 169—No. 10, Jul. 2017.

Yan Yan, "Hierarchical Classification with Convolutional Neural Networks for Biomedical Literature", International Journal of Computer Science and Software Engineering (IJCSSE), vol. 5, Issue 4, Apr. 2016, ISSN (Online): 2409-4285 www.IJCSSE.org p. 58-66.

Yunxiang Ma, "Hierarchical traffic sign recognition based on multi-feature and multi-classifier fusion", First International Conference on Information Science and Electronic Technology (ISET 2015), URL:https://www.google.com/urlsa=t&rct=j&q=&esrc=s&source=web&cd=2&ved=2ahUKEwjz8MDgudjeAhUKsI8KHXPhDnEQFjABegQICBAC&url=https%3A%2F%2Fdownload.atlantis-press.com%2Farticle%2F16695.pdf&usg=AOvVaw1JGqsJdC58pmxLxmvzoAwT.

Zhicheng Yan, "HD-CNN: Hierarchical Deep Convolutional Neural Networks for Large Scale Visual Recognition", The IEEE International Conference on Computer Vision (ICCV), 2015, pp. 2740-2748, URL: https://www.google.com/url?sa=t&rct=j&q=&esrc=s&source=web&cd=1&ved=2ahUKEwiztrqDttjeAhXFso8KHf2aCr4QFjAAegQICRAC&url=https%3A%2F%2Fwww.cv-foundation.org%2Fopenaccess%2Fcontent_iccv_2015%2Fpapers%2FYan_HD-CNN_Hierarchical_Deep_ICCV_2015_paper.pdf&usg=AOvVaw0P1pwqSzTjl3GnQo1bvDgP.

\* cited by examiner

SYSTEM AND A METHOD FOR EFFICIENT IMAGE RECOGNITION

CROSS REFERENCE TO RELATED APPLICATION

This application is related to and claims the benefit of Indian Patent Application Number 201941028755 filed on Jul. 17, 2019, the contents of which are herein incorporated by reference in their entirety.

FIELD OF THE INVENTION

The present invention relates generally to the field of image processing and image recognition. More particularly, the present invention relates to a system and a method for efficient image recognition by improving image detection accuracy and increasing throughput for multi-class image recognition.

BACKGROUND OF THE INVENTION

Image recognition systems use computer vision and image processing for detecting and recognizing objects, places, people, texts and actions in an image or a video sequence. The image recognition may generally be carried out by employing appearance based methods and feature based methods. Appearance based methods utilizes appearance of subjects and further includes traversing in sliding window fashion within the image at different scales for subject identification and are less efficient for large scale image recognition. Feature based methods have essentially gained a lot of popularity in automated image recognition systems which uses machine learning based techniques for image recognition. In feature based image recognition, feature extraction plays a vital role for describing a large input data through a reduced representation which has information that is relevant for processing. Therefore, accuracy of image recognition depends on appropriate feature selection. The image recognition systems may further utilize deep learning techniques or the like for image recognition. The image recognition techniques employing deep learning techniques implicitly extract features from regions of interest for image recognition which leads to machine based intuitive feature selection from the images for image recognition. Further, it has been observed that deep learning based techniques utilizing image traversing over different region of interest may not be able to process large number of regions of interest efficiently in an image for image recognition. Further, one or more region proposal based algorithms may be used for real-time image recognitions. Furthermore, region proposal based deep learning techniques are used which operates on selected regions of interest which are extracted either by search algorithms or by employing dedicated network for identifying region proposals.

Further, existing unified image recognition algorithms such as single shot detector (SSD), you only look once (YOLO) or the like offer improved image recognition systems which are utilized extensively for carrying out image recognition in single shot at real-time such as in the case of, but not limited to, advanced driver assistance systems (ADAS). The ADAS aims towards providing safe driving experience to drivers, enhance safety of vehicles, avoid road accidents due to any human error, reduce road accidents etc. The ADAS utilize various techniques such as, but are not limited to, warning alerts, pedestrians alerts, collision avoidance alerts, lane changing assistance, road sign recognition, parking assistance, path planning, perception or the like for assisting drivers by providing an informed control on the vehicle. One of the most critical component of ADAS is the traffic/road sign (hereinafter referred to as road sign(s)) recognition. Traditionally, the image recognition systems, may rely on color based segmentation techniques or on local feature extraction and are therefore not able to recognize an image if color, texture, template, etc. of an image is not distinguishable. Typically, road sign recognition by the ADAS is carried out utilizing real-time image recognition techniques which is a challenging task. The challenges may arise as multiple road signs require recognition in a real-time and, further, numerous classes of road signs recognition have to be carried out simultaneously.

Yet further, intra-class similarity may exist between multiple road signs which are to be recognized and such road signs may have occlusions, blur or the like. Further, other challenges may relate to inappropriate lighting conditions around the road signs, damaged road signs, different geometrical views from different positions of the road, similar looking road signs etc. Further, the single shot image recognition techniques perform multi-class recognition and it has been observed that the accuracy and throughput of such systems are also affected with increase in number of road sign classes. Furthermore, the system may be biased towards a particular class of image which has large amount of similar training data. Thus, if road signs are required to be recognized by the ADAS in these scenarios, it may greatly decrease the recognition efficiency, thereby, providing inaccurate results and low throughput.

In light of the aforementioned drawbacks, there is a need for a system and a method for providing efficient classification for multi-class image recognition in real-time. Further, there is a need for a system and a method which provides improved image detection accuracy and increased throughput for multi-class image recognition scenarios. Furthermore, there is a need for a system and a method which is not biased towards a particular class of image which has large amount of similar training data.

SUMMARY OF THE INVENTION

In various embodiments of the present invention, a method for grouping of similar image classes for image recognition is provided. The method is implemented by a processor executing instructions stored in a memory. The method comprises extracting one or more features from multiple classes of images for determining a correlation value between each of the multiple classes of images based on assessment of the extracted features of each one of the classes of images with respect to other classes of images in the multiple classes of images. The method further comprises grouping the one class of image with the other class of image in the multiple classes of images to form one or more groups of super-classes of similar class of images based on analysis of the determined correlation values with respect to a pre-determined threshold value. Finally, the method comprises recognizing an input image based on the formed groups of super-classes followed by sub-class classification of the images.

In various embodiments of the present invention, a system for grouping of similar image classes for image recognition is provided. The system comprises a memory storing program instructions, a processor configured to execute program instructions stored in the memory and an image recognition engine in communication with the processor. The image recognition engine is configured to extract one or more features from multiple classes of images for determining a correlation value between each of the multiple classes of images based on assessment of the extracted features of each one of the classes of images with respect to other classes of images in the multiple classes of images. The image recognition engine, further, groups the one class of image with the other class of image in the multiple classes of images to form one or more groups of super-classes of similar class of images based on analysis of the determined correlation values with respect to a pre-determined threshold value. Finally, the image recognition engine recognizes an input image based on the formed groups of super-classes followed by sub-class classification of the images.

In various embodiments of the present invention, a computer program product is provided. The computer program product comprises a non-transitory computer-readable medium having computer program code store thereon, the computer-readable program code comprising instructions that, when executed by a processor, caused the processor to extract one or more features from multiple classes of images for determining a correlation value between each of the multiple classes of images based on assessment of the extracted features of each one of the classes of images with respect to other classes of images in the multiple classes of images. Further, the one class of image is grouped with the other class of image in the multiple classes of images to form one or more groups of super-classes of similar class of images based on analysis of the determined correlation values with respect to a pre-determined threshold value. Finally, an input image is recognized based on the formed groups of super-classes followed by sub-class classification of the images.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for efficient image recognition. In particular, the present invention provides for multi-class image recognition in real-time with effective use of classification techniques. Further, the present invention provides for training the image recognition system based on efficient classification of image classes using various cognitive technologies, such as, but are not limited to, deep learning techniques or the like. Further, the present invention provides unbiased image recognition when a particular class with large amount of similar training data exists. Further, the present invention provides for improving the accuracy for real-time image recognition and increasing the throughput of the system for multi-class image recognition scenario.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as to unnecessarily obscure the present invention.

The present invention would now be discussed in context of embodiments as illustrated in the accompanying drawings.

Figure 1:
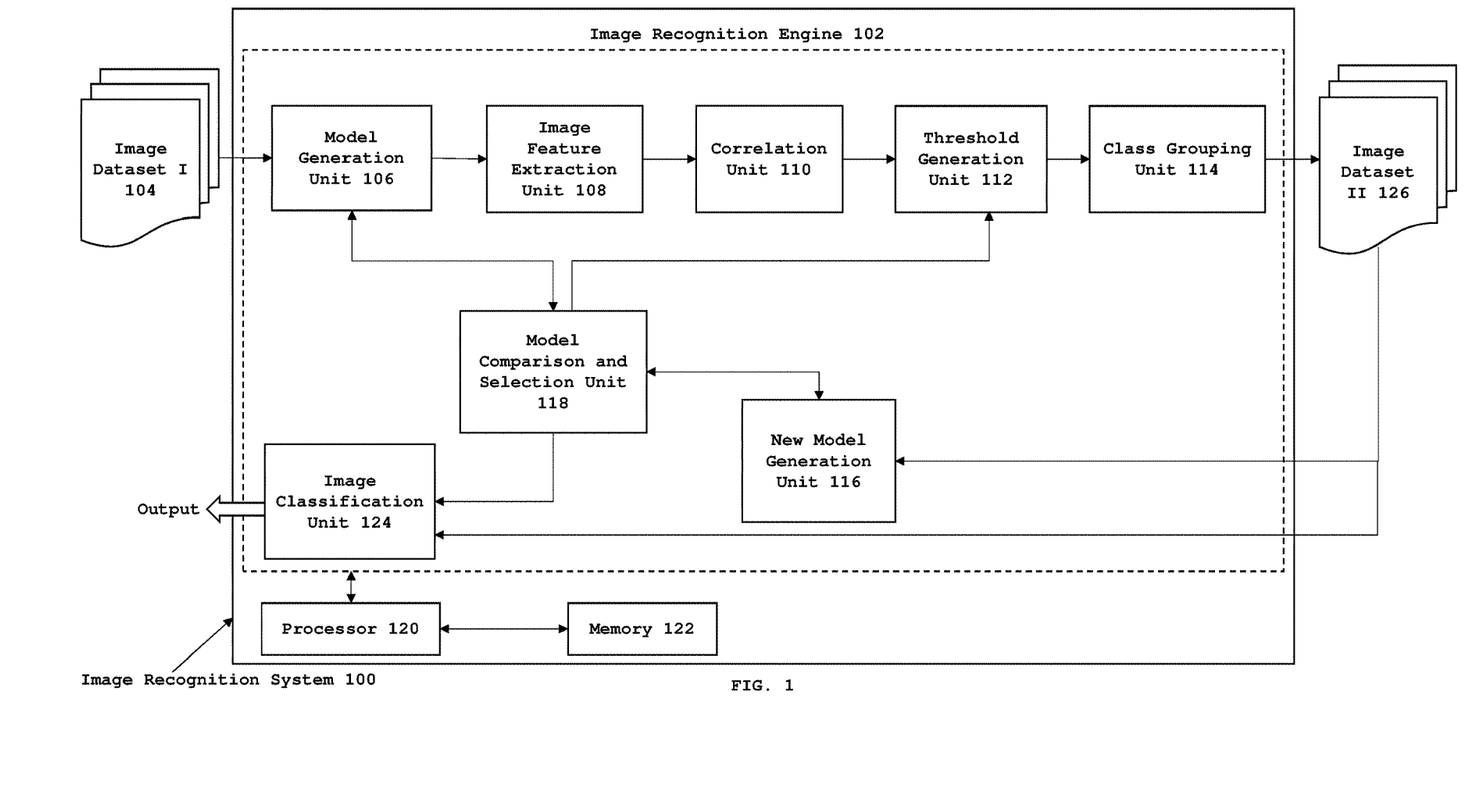
FIG. 1 is a detailed block diagram of a system for efficient image recognition, in accordance with various embodiments of the present invention.

FIG. 1 illustrates a detailed block diagram of an image recognition system 100 for efficient image recognition for a multi-class image recognition scenario, in accordance with various embodiments of the present invention.

In an embodiment of the present invention, the image recognition system 100 comprises an image recognition engine 102, a processor 120 and a memory 122. The image recognition engine 102 has built-in-intelligent mechanism for efficient image recognition. The image recognition engine 102 performs image recognition using various cognitive techniques which may include, but are not limited to, deep learning techniques or the like. The image recognition engine 102 is configured to generate deep learning models for image recognition. The deep learning models generated are subsequently trained using various classes of the labelled image datasets I 104 for image recognition. The image recognition engine 102 has multiple units which work in conjunction with each other for images recognition. The multiple units of the image recognition engine 102 are operated via the processor 120 specifically programmed for executing instructions stored in the memory 122 for executing respective functionalities of the units of the system 100 in accordance with various embodiments of the present invention.

In another embodiment of the present invention, the system 100 may be implemented in a cloud computing architecture in which data, applications, services, and other resources are stored and delivered through shared datacenters. In an exemplary embodiment of the present invention, the functionalities of the system 100 are delivered to a user as software as a service (SaaS) over a communication network.

In another embodiment of the present invention, the system 100 may be implemented as a client-server architecture. In said embodiment of the present invention, a client terminal accesses a server hosting the system 100 over a communication network. The client terminals may include but are not limited to a camera, a smart phone, a computer, a tablet, microcomputer or any other wired or wireless terminal. The server may be a centralized or a decentralized server.

In an embodiment of the present invention, the image recognition engine 102 comprises a model generation unit 106, an image feature extraction unit 108, a correlation unit 110, a threshold generation unit 112, a class grouping unit 114, a new model generation unit 116, a model comparison and selection unit 118 and an image classification unit 124.

In an embodiment of the present invention, the model generation unit 106 is configured to receive an image dataset I 104 for generating an image recognition model. The image dataset I 104 comprises model training datasets and model validation datasets. The model generation unit 106 is configured to generate one or more image recognition models. In an exemplary embodiment of the present invention, the image recognition model generated may be utilized for recognition of road signs. The image dataset I 104 received may relate to various classes of road sign images. The class of road sign is representative of a type of road sign. The road sign types may include, but are not limited to, 60 kmph speed limit signs, 80 kmph speed limit signs, right turn road signs, left turn road signs, U-turn road signs, stop signs, pedestrian crossing road signs or the like. Further, multiple classes of road signs are provided as images datasets. The inputted image datasets I 104 are fed to a deep learning based architecture, such as, but is not limited to, convolutional neural networks (CNN) or the like for road sign recognition model generation. The CNN utilized may relate to single shot image classifier such as, you only look once (YOLO) architecture, single shot detector (SSD) architecture or the like. The CNN based architecture uses the inputted image datasets I 104 for generating a road sign image recognition model based on the features of the inputted images. The models generated are utilized for recognizing multiple classes of road sign images.

Further, in operation, the model generation unit 106 is configured to train the generated image recognition models for multi-class road sign recognition. The training of the generated road sign recognition model is carried out by a supervised machine learning based technique. The model is trained by inputting various image datasets I 104 of multiple classes of road signs as training dataset. The image dataset I 104 may be inputted as a video via a color camera such as a mono camera or stereo camera or the like mounted on a vehicle. The image dataset I 104 received as a video is processed frame-by-frame for providing the frames as image dataset I 104 for training and validating the road sign recognition model. Further, the datasets are labelled and analyzed for presence of different conditions and scenarios relating to road signs for training the deep learning classification model. The datasets are labelled for determining the region of interest in the image and the class of road signs in the images. For example, for the image dataset I 104, which has been labelled, the region of interest may be the position of the road sign(s) in that image and the class of that road signs in the images, which may include, but is not limited to, road sign directing left, right, straight or the like. The conditions and scenarios may include, but are not limited to, different daylight i.e. ranging from dawn to dusk, different weathers i.e. sunny, foggy or rainy, partial occlusions, different range of distance of road signs from the point of capture, different view angles or the like. In an exemplary embodiment of the present invention, generative adversarial network (GAN) techniques, data augmentation techniques or the like are further utilized for generating images of road signs and introducing some variation in the image datasets I 104 with regard to different conditions and scenarios. The GAN techniques applied are further utilized to maintain uniformity of the skewed and/or unevenly distribution of image data and restricts the generated road sign recognition model to become biased towards images dataset classes, if image datasets classes for a particular image class are more in number. The images generated having variations are, therefore, provided to the deep learning network for training the generated image recognition model. Therefore, the trained image recognition model is capable of recognizing various road signs of various classes without being biased towards different conditions and scenarios.

Further, the generated image recognition model is categorized as a base model, which is flagged using a score. In an exemplary embodiment of the present invention, the base model generated is flagged using model performance measurement techniques such as, but are not limited to, F1 score technique or the like. Therefore, F1 score provides performance of the generated image recognition model when applied for image recognition.

In an embodiment of the present invention, the image feature extraction unit 108 is configured to extract the features of the road signs from the images utilizing the generated base image recognition model. The features are extracted for each class of road signs images provided by the image dataset I 104. The features extracted may include, but are not limited to, fully connected (FC) features or the like. The FC features extracted by the image feature extraction unit 108 are different for each class of images but are associated with that particular class. The FC features extracted are utilized for the final recognition of the images. For example, FC features extracted may include, but are not limited to, high level features, color features, texture, shape or the like. The FC features may aid in obtaining distinct and useful pattern from the image dataset I 104. The image feature extraction unit 108 is configured to pass and execute one or more 'k' instances to extract features for each class of images, wherein 'k' is a pre-determined experimental parameter. Further, features extracted using one or more 'k' instances for each class are averaged over each class for feature representation.

In an embodiment of the present invention, the correlation unit 110 is configured to receive the extracted FC features of each image classes from the image feature extraction unit 108. The correlation unit 110 is configured to assess similarity between each image class by analyzing extracted FC features from the image classes for determining a correlation between each class of images and provide a 'correlation value'. The correlation value provides an estimation of correlation of one class of road sign image with respect to another class of road sign image based on the analyzed FC features. In an exemplary embodiment of the present invention, the correlation value for each class of images with respect to another class of image is in the range of 0 to 1. The correlation unit 110 is configured to assemble the correlation values in a matrix form. The formed matrix is represented as a 'correlation matrix' in which the determined correlation values of each class with respect to other classes are provided. The matrix comprises rows and columns of the correlation values of each class of image with respect to another class of image. The formed matrix may be represented in m x n form, wherein 'm' represents number of rows and 'n' represents number of columns. The rows and columns in the matrix are equal to the number of classes of images analyzed for determining the correlation. For example, if FC features of 10 classes of images are analyzed, the correlation matrix may have 10×10 rows and columns; if FC features of 5 classes of images are analyzed, the correlation matrix may have 5×5 rows and columns etc. Further, each class of image is assigned a value from 0 to n depending on the number of classes analyzed for correlation value estimation based on FC features for various classes. Further, the diagonal values of the correlation matrix are represented as equal to 1. Further, the correlation values of one class of images with respect to another class of images above the diagonal are identical to the correlation values below the diagonal. In various exemplary embodiments of the present invention, the correlation matrix is formed once for the set of road sign classes among which the correlation values are to be estimated for each class with respect to the another classes. Further, similarity of one class with another class of road sign image is estimated based on the correlation values of various road sign classes. In an exemplary embodiment of the present invention, if the correlation value of a second class of road sign with respect to a first class of road sign is higher than the correlation value of the second class of road sign with respect to a third class of road sign, then the second class and the first class are considered to be highly correlated or similar. For example, if multiple classes of road signs are processed, which are providing directions using straight arrow, left arrow or right arrow, or a stop sign, hump sign, U-turn sign, 60 kmph and 90 kmph speed limit signs, the correlation unit 110 assesses similarity between these road signs. The similarity assessment is carried out based on the extracted FC features. The extracted features of these images may, therefore, relate to high level features, color, texture, shape or the like. The extracted features show similarity with each other and are assessed to detect similarity between these road sign classes and provide the correlation value. Therefore, the correlation unit 110 is configured to analyze the extracted features of each road sign classes to determine similarity between multiple road sign classes for providing the correlation value.

In an embodiment of the present invention, the threshold generation unit 112 is configured to receive the formed correlation matrix comprising correlation values of each class of road sign with respect to the other class. The threshold generation unit 112 is configured to analyze the correlation values present in each row of the correlation matrix with a pre-determined threshold value such that based on the output of matching, the correlation values are utilized for grouping the highly correlated classes. The pre-determined threshold value utilized by the threshold generation unit 112 may be an adaptively generated value, which is generated based on the requirement of level of grouping required to be achieved for the given number of classes, or a heuristically generated value, which are based on sorted correlation values or the like. In an exemplary embodiment of the present invention, the pre-determined threshold value selected is between 0 and 1. Further, the correlated values providing the correlation of one class with another class in each row of the correlation matrix are analyzed against the pre-determined threshold value. The class correlation values present in the correlation matrix may be greater than the pre-determined threshold value or less than the pre-determined threshold value. The threshold generation unit 112 is configured to analyze the correlation values in each row of the correlation matrix with the pre-determined threshold value. The threshold generation unit 112 is configured to discard or nullify all the correlation matrix values which are less than the current pre-determined threshold value and therefore mark such values as zero. Further, the correlation matrix values which are greater than the pre-determined threshold value are retained. Therefore, each row of the correlation matrix comprises one or more non-zero correlation values and zero in place of one or more correlation values which are less than the pre-determined threshold value after matching against the pre-determined threshold value. The non-zero values are those correlation values which are higher than the pre-determined threshold value. The non-zero correlation values for 'n' number of road sign classes in a row of the correlation matrix are considered to provide a correlation among the road sign classes and such road sign classes having non-zero correlation values may be highly correlated. Further, the threshold generation unit 112 is configured to keep decreasing the pre-determined threshold value selected at the first instance, but not equal to zero or less than zero, after applying the pre-determined threshold value on first instance, depending on the requirement of grouping required for multiple classes of images. Therefore, a different pre-determined threshold value may be generated and applied each time on the same correlation matrix on which the pre-determined threshold value was applied at the first instance.

In an embodiment of the present invention, the class grouping unit 114 is configured to receive the correlation matrix comprising the non-zero correlation values and the zero values after comparison with the pre-determined threshold value from the threshold generation unit 112. The non-zero correlation values in a row of the correlation matrix are considered to provide a correlation among the road sign classes placed in that particular row. The class grouping unit 114 is further configured to separately analyze each row of the received correlation matrix. The class grouping unit 114 is configured to group the road sign image classes present in a row of the correlation matrix having non-zero correlation values and therefore form a group of such classes. The grouped classes are considered to be highly correlated and may have similar features with respect to each other. Further, after grouping the correlated classes, the one or more classes may be left which may not be grouped and are treated as non-grouped classes. Further, after grouping the correlated classes, the one or more groups formed along with the one or more non-grouped classes are treated as a group set. In an exemplary embodiment of the present invention, the grouped classes of images with similar image features may be considered as a super-class of road signs. Further, one or more super-classes of images may be formed. For example, correlation between 5 classes of images is determined by forming a correlation matrix and out of 5 classes of road signs, if 2 road signs have high correlation as compared to other classes, based on the pre-determined threshold value, the 2 road sign classes are grouped. The group of 2 classes is, therefore, treated as a single class of road signs. Thus, 4 road sign classes are formed after grouping of 2 road signs out of 5 road sign classes, as the grouped classes are treated as one class along with other 3 separate classes. Therefore, a reduced number of road sign classes is provided. The grouped 2 classes are considered as a super-class of road signs along with 3 non-grouped classes and together they are treated as a group set. Further, one or more image classes may belong to more than one group within a group set and are treated as an overlapping class. The class grouping unit 114 is further configured to separately analyze all the groups within a group set for determining the overlapping classes. The overlapping classes are compared with other classes in each group to which they belong for determining correlation value of such overlapping class to other classes of that group. Further, the overlapping class is retained only in a single group having highest correlation value as compared to other groups. The overlapping class is thereafter removed from the group wherein the correlation value of the overlapping class with other classes in the group is comparatively lower. Finally, a new group set is formed without any overlapping classes. The class grouping unit 114 is further configured to compare the newly formed group set with previously generated group sets, which are stored in a group storage database (not shown) to avoid group set duplication. Further, only a unique new group set is stored in the group storage database (not shown) for further application for super-class image recognition.

In another embodiment of the present invention, the class grouping unit 114 is configured to provide the output comprising unique group sets of grouped classes of road signs along with the non-grouped classes of road signs are provided to an image dataset II 126. The grouped classes of road signs are provided to form the image dataset II 126 as super-class labels. The super-class labels are provided to the new model generation unit 116 for generating a new model for image recognition utilizing the formed super-classes for road signs. The image dataset II 126 is an updated dataset with the super-class labels instead of separate class labels utilized previously for the image dataset I 104.

In an embodiment of the present invention, the new model generation unit 116 is configured to receive one or more updated image dataset II 126 which is labelled with super-classes of road signs which are utilized for road sign recognition at super-class level. The new model generation unit 116 is further configured to generate a new model for road sign recognition based on the super-classes of road signs after receiving the labelled datasets with super-classes of road sign images. Further, base model generation based deep learning techniques are utilized by the new model generation unit 116 for generating and training the new model for recognizing a road sign at a super-class level. The deep learning techniques utilized may include, but are not limited to neural networks or the like. The new model is trained based on the super-classes of road sign image dataset II 126. The new model generated for road sign recognition, based on the super-classes of road signs, reduces the number of road sign recognition classifiers. In an exemplary embodiment of the present invention, the new model is capable of recognizing road sign images based on the super-classes of images. For example, for generating and training the new image recognition model with the super-class labels with 40 image classes, the 40 image classes may be clustered in 10 super-classes based on the correlation between the classes. Therefore, each of the 10 super-classes may equally include 4 grouped classes. Accordingly, 10 classifiers are required at first level of classification and 4 classifiers for sub-class classification by the image classification unit 124. Further, the new model generation unit 116 is configured to flag the generated new model. The new model generated is flagged using model performance measurement techniques such as, but are not limited to, F1 score technique or the like. Therefore, the generated new image recognition model is utilized for recognizing similar image classes as one class of images. Further, the generated new image recognition model is configured to recognize the images, if relating to a similar class, as the super-class of images.

In an embodiment of the present invention, the model comparison and selection unit 118 communicates with the threshold generation unit 112 iteratively after a new image recognition model is generated. The threshold generation unit 112 is configured to reduce the pre-determined threshold value generated after generation of new image recognition model to increase the grouping of road signs for generating multiple new image recognition models. Further after lowering of the pre-determined threshold and generation of new models by the new model generation unit 116, if F1 score of the preferred new model is greater than the F1 score of the base model, the new model is stored in the model storage database (not shown). However, if the F1 score of the preferred new model is less than the F1 score of the base model, the new image recognition model is discarded and not stored in the model storage database (not shown) and the iteration of lowering the pre-determined threshold value is also terminated.

In another embodiment of the present invention, the model comparison and selection unit 118 is configured to communicate with the model generation unit 106 for receiving the F1 score of the base model and further communicate with the new model generation unit 116 for receiving the F1 score of the new image recognition model. The model comparison and selection unit 118 compares the received F1 scores for selecting the most suitable model from the generated one or more new models with respect to the base model which is to be applied for efficient image recognition. After comparison of the F1 scores, if F1 score of the new model is found to be greater than the F1 score of the previously generated base model, the new model is thereafter stored in a model storage database (not shown) and further applied for image recognition as super-classes of road signs. Further, after comparison of the F1 scores, if F1 score of the generated new model is found to be less than the F1 score of the previously generated base model, then the new model generation is terminated. In yet another embodiment of the present invention, the model comparison and selection unit 118 is configured to analyse all the new models stored in the model storage database (not shown), after termination of new model generation, to select the most efficient model from the stored models and is therefore treated as a best model for road sign image recognition as super-classes. In an exemplary embodiment of the present invention, the best model is selected using model comparison measurement techniques such as, but are not limited to, comparison of F1 score, comparison of weighted sum of F1 score, throughput and the number of groups formed or the like.

In an embodiment of the present invention, the image classification unit 124 is configured to receive the super-class labelled dataset II 126 which is utilized by the image classification unit 124 to generate and train a separate image recognition model for road sign recognition at sub-class level. The received super-class labelled datasets II 126 are based on super-classes recognized utilizing the best model selected by the model comparison and selection unit 118. In another embodiment of the present invention, the image classification unit 124 is configured to receive the recognized super-classes of images for classifying the recognized super-classes of road sign images into sub-classes based on the identified super-classes for deeper recognition of road signs. The sub-class of images distinguishes each image class recognized in the super-class as a separate image class. The image classification unit 124 segregates the recognized image super-classes into their sub-classes by applying machine learning based classification techniques. The machine learning based classification techniques applied may include, but are not limited to, Naïve Bayes classifier, Support Vector Machine (SVM) or the like. For instance, an image dataset of 20 different classes a group of four super-classes are formed. Each group comprises five classes as sub-classes. At the first stage, only four super-classes of images are required for image classification and thereafter five sub-classes of image classes are required for image recognition. Further, if image belongs to one of the four super-class groups, other groups are not accessed for road sign recognition at sub-class level, therefore, reducing the number of classes required by multi-class image recognition classifiers. Further, the output from the image classification unit 124 with the recognized image is communicated to the client terminal (not shown) for providing the recognized road sign classes. The client terminal (not shown) may include, but is not limited to, an ADAS system, an image recognition device, a mobile device, a GPS device, a tablet, a computing system or the like.

Advantageously, in accordance with various embodiments of the present invention, the system 100 is configured to reduce the number of image classes to be recognized by the image recognition models for recognizing a road sign. Further, the system 100 has built-in-intelligent mechanism to reduce the number of classes for image recognition by grouping the similar image classes based on similarity between their features. Therefore, there is provided a hierarchy of road sign recognition classifiers for road sign recognition i.e. a super-class and a sub-class associated with the super-class of images. Thus, a sub-class classification of images is carried out efficiently, if a super-class of images is detected. The system 100 groups similar class road signs in a super-class based on similar features for reducing the number of classes of images recognized using single shot image recognition techniques for image classification by image recognition systems. Furthermore, the system 100 is not biased when a particular class with large amount of similar training data exists and therefore provides improved accuracy for real-time image recognition with increased throughput.

Figure 2:
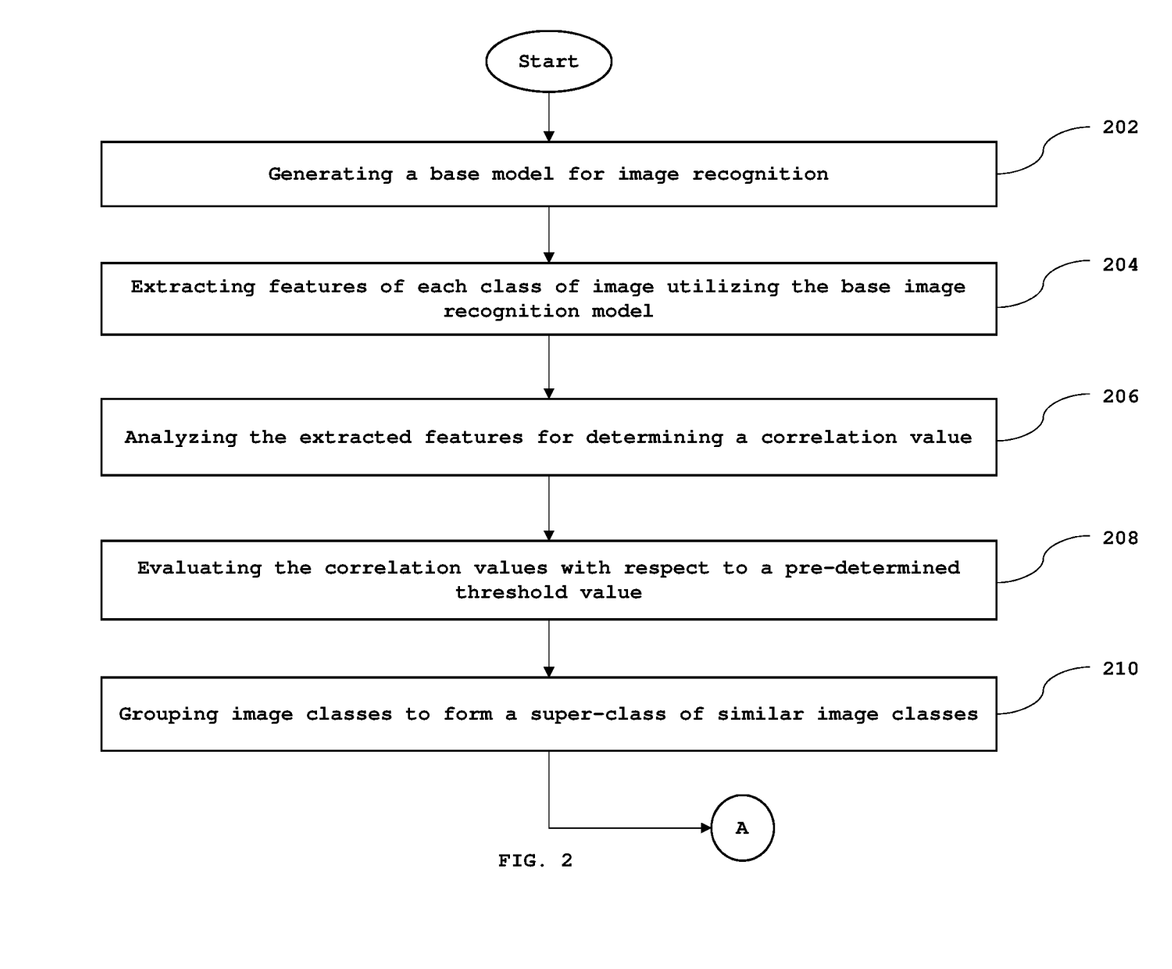
FIG. 2 is a flowchart illustrating a method for efficient image recognition, in accordance with various embodiments of the present invention.

FIG. 2 is a flowchart illustrating a method for efficient image recognition, in accordance with various embodiments of the present invention.

At step 202, a base model for image recognition is generated. In an exemplary embodiment of the present invention, the image recognition model generated may be utilized for recognition of road signs. The image dataset I received may relate to various classes of road sign images. The class of road sign is representative of a type of road sign. The road sign types may include, but are not limited to, 60 kmph speed limit signs, 80 kmph speed limit signs, right turn road signs, left turn road signs, U-turn road signs, stop signs, pedestrian crossing signs or the like. Further, multiple classes of road signs are provided as images datasets. The inputted image datasets I are fed to a deep learning based architecture, such as, but is not limited to, convolutional neural networks (CNN) or the like for road sign recognition model generation. The CNN utilized may relate to single shot image classifier such as, you only look once (YOLO) architecture, single shot detector (SSD) architecture or the like. The CNN based architecture uses the inputted image datasets I for generating a road sign image recognition model based on the features of the inputted images. The models generated are utilized for recognizing multiple classes of road sign images.

Further, in operation the generated image recognition models for multi-class road sign recognition is trained. The training of the generated road sign recognition model is carried out by a supervised machine learning based technique. The model is trained by inputting various image datasets I of multiple classes of road signs as training dataset. The image dataset I may be inputted as a video via a color camera such as a mono camera or stereo camera or the like mounted on a vehicle. The image dataset I received as a video is processed frame-by-frame for providing the frames as image dataset I for training and validating the road sign recognition model. Further, the datasets are labelled and analyzed for presence of different conditions and scenarios relating to road signs for training the deep learning classification model. The datasets are labelled for determining the region of interest in the image and the class of road signs in the images. For example, the image dataset I which has been labelled, the region of interest may be the position of the road sign(s) in that image and the class of that road signs in the images, which may include, but is not limited to, road sign directing left, right, straight or the like. The conditions and scenarios may include, but are not limited to, different daylight i.e. ranging from dawn to dusk, different weathers i.e. sunny, foggy or rainy, partial occlusions, different range of distance of road signs from the point of capture, different view angles or the like. Further, it may not be possible to capture all the conditions and scenarios for multiple classes of road sign. Therefore, to leverage these aspects, generative adversarial network (GAN) techniques, data augmentation techniques or the like are further utilized for generating images of road signs and introducing some variation in the image datasets I with regard to different conditions and scenarios. The GAN techniques applied are further utilized to maintain uniformity of the skewed and/or unevenly distribution of image data and restricts the generated road sign recognition model to become biased towards images dataset classes, if image datasets classes for a particular image class are more in number. The images generated having variations are therefore, provided to the deep learning network for training the generated image recognition model. Therefore, the trained image recognition model is capable of recognizing various road signs of various classes without being biased towards different conditions and scenarios.

Further, the generated image recognition model is categorized as a base model, which is flagged using a score. In an exemplary embodiment of the present invention, the base model generated is flagged using model performance measurement techniques such as, but are not limited to, F1 score technique or the like. Therefore, F1 score provides performance of the generated image recognition model when applied for image recognition.

At step 204, features of each image class are extracted utilizing the base image recognition model. In an embodiment of the present invention, the features are extracted for each classes of images provided by the image dataset I. The features extracted may include, but are not limited to, fully connected (FC) features or the like. The FC features extracted are different for each class of images but are associated with that particular class. The FC features extracted are utilized for the final recognition of the images. For example, FC features extracted may include, but are not limited to, high level features, color features, texture, shape, or the like. The FC features may aid in obtaining distinct and useful pattern from the image dataset I. The one or more 'k' instances are passed and executed to extract features for each class of images, wherein 'k' is a pre-determined experimental parameter. Further, features extracted using one or more 'k' instances for each class are averaged over each class for feature representation.

At step 206, the extracted features are analyzed for determining a correlation value. In an embodiment of the present invention, similarity between each image class is assessed by analyzing extracted FC features from the image classes for determining a correlation between each class of image and provide a 'correlation value'. The correlation value provides an estimation of correlation of one class of road sign image with respect to another class of road sign image based on the analyzed FC features. In an exemplary embodiment of the present invention, the correlation value for each class of images with respect to another class of image is in the range of 0 to 1. The correlation values are assembled in a matrix form. The formed matrix is represented as a 'correlation matrix' in which the determined correlation values of each class with respect to other classes are provided. The matrix comprises rows and columns of the correlation values of each class of image with respect to another class of image. The formed matrix may be represented in m×n form, wherein 'm' number of represents rows and 'n' represents number of columns. The rows and columns in the matrix are equal to the number of classes of images analyzed for determining the correlation. For example, if FC features of 10 classes of images are analyzed, the correlation matrix may have 10×10 rows and columns; if FC features of 5 classes of images are analyzed, the correlation matrix may have 5×5 rows and columns etc. Further, each class of image is assigned a value from 0 to n depending on the number of classes analyzed for correlation value estimation based on FC features for various classes. Further, the diagonal values of the correlation matrix are represented as equal to 1. Further, the correlation values of one class of images with respect to another class of images above the diagonal are identical to the correlation values below the diagonal. In various exemplary embodiments of the present invention, the correlation matrix is formed once for the set of road sign classes among which the correlation values are to be estimated for each class with respect to the another classes. Further, similarity of one class with another class of road sign image is estimated based on the correlation values of various road sign classes. In an exemplary embodiment of the present invention, if the correlation value of a second class of road sign with respect to a first class of road sign is higher than the correlation value of the second class of road sign with respect to a third class of road sign, then the second class and the first class are considered to be highly correlated or similar. For example, if multiple classes of road signs are processed, which are providing directions using straight arrow, left arrow or right arrow, or a stop sign, hump sign, U-turn sign, 60 kmph and 90 kmph speed limit signs, similarity between these road signs is assessed. The similarity assessment is carried out based on the extracted FC features. The extracted features of these images may, therefore, relate to high level features, color, texture, shape or the like. The extracted features show similarity with each other and are assessed to detect similarity between these road sign classes and provide the correlation value. Therefore, the extracted features of each road sign classes are analyzed to determine similarity between multiple road sign classes for providing the correlation value.

At step 208, correlation values are evaluated with respect to a pre-determined threshold value. In an embodiment of the present invention, the correlation values present in each row of the correlation matrix are analyzed with the pre-determined threshold value such that based on the output of matching, the correlation values are utilized for grouping the highly correlated classes. The pre-determined threshold value utilized may be an adaptively generated value, which is generated based on the requirement of level of grouping required to be achieved for the given number of classes, or a heuristically generated value, which are based on sorted correlation values or the like. In an exemplary embodiment of the present invention, the pre-determined threshold value selected is between 0 and 1. Further, the correlated values providing the correlation of one class with another class in each row of the correlation matrix are analyzed against the pre-determined threshold value. The class correlation values present in the correlation matrix may be greater than the pre-determined threshold value or less than the pre-determined threshold value. The correlation values in each row of the correlation matrix are analyzed with the pre-determined threshold value. Further, all the correlation matrix values which are less than the pre-determined threshold value are discarded or nullified and are therefore marked as zero. Further, the correlation matrix values which are greater than the pre-determined threshold value are retained. Therefore, each row of the correlation matrix comprises one or more non-zero correlation values and zero in place of one or more correlation values which are less than the pre-determined threshold value after matching against the pre-determined threshold value. The non-zero values are those correlation values which are higher than the pre-determined threshold value. The non-zero correlation values for 'n' number of road sign classes in a row of the correlation matrix are considered to provide a correlation among the road sign classes and such road sign classes having non-zero correlation values may be highly correlated. Further, the pre-determined threshold value selected at the first instance is decreased, but not equal to zero or less than zero, after applying the pre-determined threshold value on first instance, depending on the requirement of grouping required for multiple classes of images. Therefore, a different pre-determined threshold value may be generated and applied each time on the same correlation matrix on which the pre-determined threshold value was applied at the first instance.

At step 210, image classes are grouped to form a super-class of similar image classes. In an embodiment of the present invention, the non-zero correlation values in a row of the correlation matrix are considered to provide a correlation among the road sign classes placed in that particular row. Further, each row of the correlation matrix is analyzed separately. The road sign image classes present in a row of the correlation matrix having non-zero correlation values are grouped and therefore a group of such classes is formed. The grouped classes are considered to be highly correlated and may have similar features with respect to each other. Further, after grouping the correlated classes, the one or more classes may be left which may not be grouped and are treated as non-grouped classes. Further, after grouping the correlated classes, the one or more groups formed along with the one or more non-grouped classes are treated as a group set. In an exemplary embodiment of the present invention, the grouped classes of images with similar image features may be considered as a super-class of road signs. Further, one or more super-classes of images may be formed. For example, correlation between 5 classes of images is determined by forming a correlation matrix and out of 5 classes of road signs, if 2 road signs have high correlation as compared to other classes, based on the pre-determined threshold value, the 2 road sign classes are grouped. The group of 2 classes is, therefore, treated as a single class of road signs. Thus, 4 road sign classes are formed after grouping of 2 road signs out of 5 road sign classes, as the grouped classes are treated as one class along with other 3 separate classes. Therefore, a reduced number of road sign classes is provided. The grouped 2 classes are considered as a super-class of road signs along with 3 non-grouped classes and together they are treated as the group set. Further, one or more image classes may belong to more than one group within a group set and are treated as an overlapping class. Further, all the groups within a group set are separately analyzed for determining the overlapping classes. The overlapping classes are compared with other classes in each group to which they belong for determining correlation of such overlapping class to other classes of that group. Further, the overlapping class is retained only in a single group having highest correlation value as compared to other classes in other groups. The overlapping class is thereafter removed from the group wherein the correlation value of the overlapping class with other classes in the group is comparatively lower. Finally, a new group set is formed from the formed group set without any overlapping classes. Further, the newly formed group set are compared with previously generated group sets to avoid group set duplication. Further, only unique new group set is stored for further application for super-class image recognition.

In another embodiment of the present invention, the output comprising unique group sets of grouped classes of road signs with the non-grouped classes of road signs are provided to an image dataset II. The grouped classes of road signs are provided to form the image dataset II as super-class labels. The super-class labels are provided for generating a new model for image recognition utilizing the formed super-classes for road signs. The image dataset II is an updated dataset with the super-class labels instead of separate class labels utilized previously for the image dataset I.

At step 212, a new image recognition model is generated with labeled dataset of super-classes of images. In an embodiment of the present invention, a new model for road sign recognition is generated based on the super-classes of road signs utilizing the labelled datasets with super-classes of road sign images. Further, base model generation based deep learning technique is utilized for generating and training the new model for recognizing a road sign at a super-class level. The deep learning techniques utilized may include, but are not limited to neural networks or the like. The new model is trained based on the super-classes of road sign image dataset II. The new model generated for road sign recognition, based on the super-classes of road signs, reduces the number of road sign recognition classifiers. In an exemplary embodiment of the present invention, the new model is capable of recognizing road sign images based on the super-classes of images. For example, for generating and training the new image recognition model with the super-class labels with 40 image classes, the 40 image classes may be clustered in 10 super-classes based on the correlation between the classes. Therefore, each of the 10 super-classes may equally include 4 grouped classes. Accordingly, 10 classifiers are required at first level of classification and 4 classifiers for sub-class classification. Further, the generated new model is flagged. The new model generated is flagged using model performance measurement techniques such as, but are not limited to, F1 score technique or the like. Therefore, the generated new image recognition model is utilized for recognizing similar image classes as one class of images.

At step 214, the images are recognized as the super-class of images utilizing the new image recognition model. In an embodiment of the present invention, the generated new image recognition model is configured to recognize the images, if relating to a similar class, as the super-class of images.

At step 216, the pre-determined threshold value is reduced and the generated new image recognition model is compared with the base model. In an embodiment of the present invention, the pre-determined threshold value is reduced iteratively after generation of new image recognition model to increase the grouping of road signs for generating multiple new image recognition models. Further after lowering of the pre-determined threshold and generation of new models, if F1 score of the preferred new model is greater than the F1 score of the base model, the new model is stored. However, if the F1 score of the preferred new model is less than the F1 score of the base model, the new image recognition model is discarded and not stored and the iteration of lowering the pre-determined threshold value is also terminated.

In another embodiment of the present invention, the F1 scores of the new model and the base model are compared for selecting the most suitable model from the generated one or more new model with respect to the base model which is to be applied for efficient image recognition. After comparison of the F1 scores, if F1 score of the new model is found to be greater than the F1 score of the previously generated base model, the new model is stored in a model storage database (not shown) and further applied for image recognition as super-classes of road signs. Further, after comparison of the F1 scores, if F1 score of the generated new model is found to be less than the F1 score of the previously generated base model, then the new model generation is terminated. In yet another embodiment of the present invention, all the new models stored in the model storage database (not shown) are analysed, after termination of new model generation, for selecting the most efficient model from the stored models and is therefore treated as a best model for road sign image recognition as super-classes. In an exemplary embodiment of the present invention, the best model is selected using model comparison measurement techniques such as, but are not limited to, comparison of F1 score, comparison of weighted sum of F1 score, throughput and the number of groups formed or the like.

At step 218, the recognized super-classes are classified into sub-classes. In an embodiment of the present invention, the super-class labelled dataset II is utilized to generate and train a separate image recognition model for road sign recognition at sub-class level. The received super-class labelled datasets II are based on super-classes recognized utilizing the best model selected. In another embodiment of the present invention, the recognized super-classes of road sign images are classified into sub-classes based on the identified super-classes for deeper recognition of road signs. The sub-class of images distinguishes each image class recognized in the super-class as a separate image class. The recognized image super-classes are segregated into their image sub-classes by applying machine learning based classification techniques. The machine learning based classification techniques applied may include, but are not limited to, Naïve Bayes classifier, Support Vector Machine (SVM) or the like. For instance, an image dataset of 20 different classes a group of four super-classes are formed. Each group comprises five classes as sub-classes. At the first stage, only four super-classes of images are required for image classification and thereafter five sub-classes of image classes are required for image recognition. Further, if image belongs to one of the four super-class groups, other groups are not accessed for road sign recognition at sub-class level, therefore, reducing the number of classes required by multi-class image recognition classifiers. Further, the output with the recognized image is communicated to the client terminal (not shown) for providing the recognized road sign classes. The client terminal (not shown) may include, but is not limited to, an ADAS system, an image recognition device, mobile device, a GPS device, a tablet, a computing system or the like.

Figure 3:
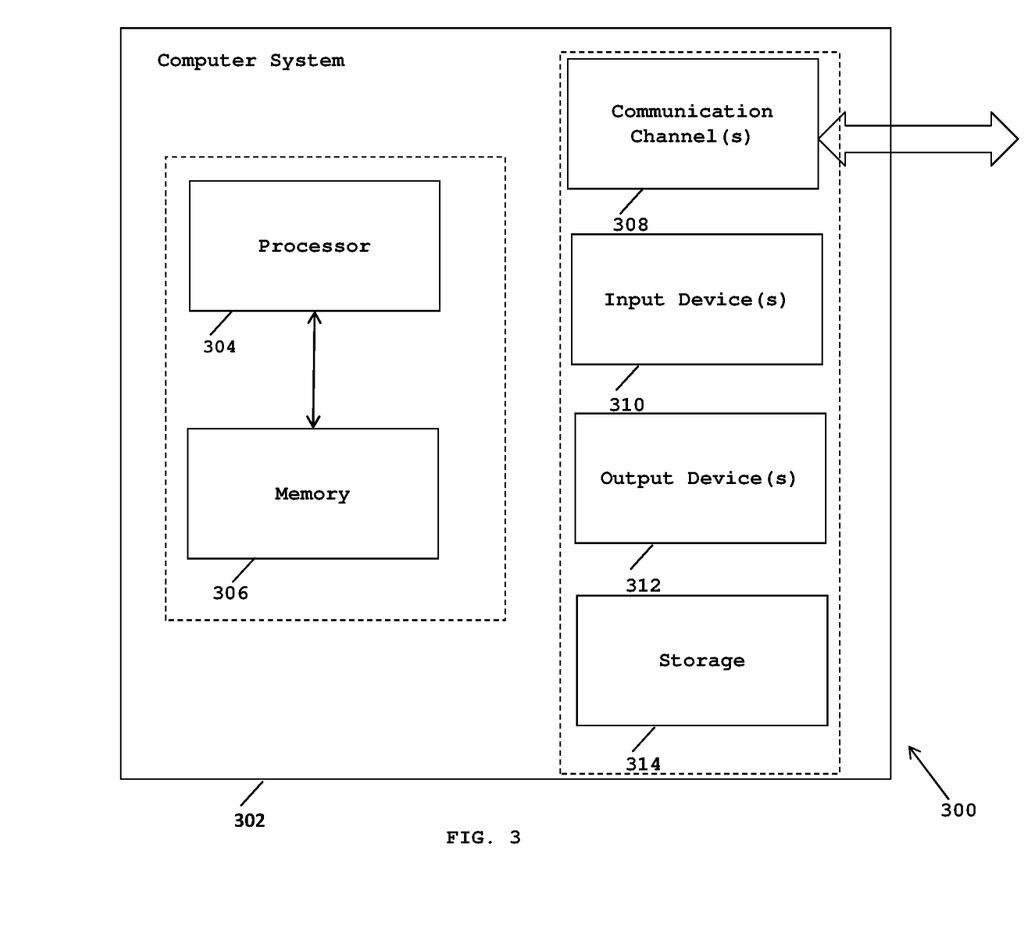
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for grouping of similar image classes for image recognition, the method is implemented by a processor executing instructions stored in a memory, the method comprising:

extracting one or more features from multiple classes of images for determining a correlation value between each of the multiple classes of images based on assessment of the extracted features of each one of the classes of images with respect to other classes of images in the multiple classes of images, wherein the correlation values are computed in a matrix form, and wherein the matrix comprises rows and columns equal to the number of image classes analyzed for determining the correlation values;

grouping the one class of image with the other class of image in the multiple classes of images to form one or more groups of super-class of similar class of images based on analysis of the determined correlation values with respect to a pre-determined threshold value; and recognizing an input image based on the formed groups of super-classes followed by sub-class classification of the images.

2. The method as claimed in claim 1, wherein the features from the multiple image classes are extracted by executing a pre-determined parameter on each of the classes of images utilizing an image recognition base model.

3. The method as claimed in claim 1, wherein the correlation value represents an estimation of correlation of the one class of image with respect to the another class of image in the multiple classes of images.

4. The method as claimed in claim 1, wherein the groups of super-classes with correlated classes are formed if the correlation value of the one class of image with respect to the other class of image in a row of the matrix is higher than the pre-determined threshold value.

5. The method as claimed in claim 1, wherein the one or more image classes in the super-class group belongs only to a particular super-class group without overlapping with another super-class group of comparatively lower correlation.

6. The method as claimed in claim 1, wherein the groups of super-classes of correlated image classes are labelled for generating one or more new image recognition models for recognition of inputted images as super-classes.

7. The method as claimed in claim 1, wherein the pre-determined threshold value is decreased for increasing the grouping of the one class of image with another class of image in the multiple classes of images.

8. The method as claimed in claim 7, wherein based on the increased grouping multiple groups of super-classes of similar class of images are formed.

9. The method as claimed in claim 6, wherein a best model is selected from the one or more new models for image recognition as super-class.

10. The method as claimed in claim 1, wherein the super-class of images recognized are classified into one or more sub-classes at least by one of: a sub-class image recognition model; and an image classification technique.

11. A system for grouping of similar image classes for image recognition, the system comprising:
- a memory storing program instructions;
- a processor configured to execute program instructions stored in the memory; and
- an image recognition engine in communication with the processor and configured to:
  - extract one or more features from multiple classes of images for determining a correlation value between each of the multiple classes of images based on assessment of the extracted features of each one of the classes of images with respect to other classes of images in the multiple classes of images,
  - wherein the correlation values are computed in a matrix form, and
  - wherein the matrix comprises rows and columns equal to the number of image classes analyzed for determining the correlation values;
  - group the one class of image with the other class of image in the multiple classes of images to form one or more groups of super-classes of similar class of images based on analysis of the determined correlation values with respect to a pre-determined threshold value; and
  - recognize an input image based on the formed groups of super-classes followed by sub-class classification of the images.

12. The system as claimed in claim 11, wherein the image recognition engine comprises a model generation unit in communication with the processor, the model generation unit is configured to generate a base model for image recognition, wherein the base model is utilized for feature extraction from the multiple classes of images.

13. The system as claimed in claim 11, wherein the image recognition engine comprises a threshold generation unit in communication with the processor, the threshold generation unit is configured to analyze the correlation values present in each row of the matrix with a pre-determined threshold value.

14. The system as claimed in claim 11, wherein the image recognition engine comprises a class grouping unit in communication with the processor, the class grouping unit is configured to group the one class of image with the other class of image to form a super-class of images if the correlation value of the one class of image with respect to the other class of image in a row of the matrix is higher than the pre-determined threshold value.

15. The system as claimed in claim 11, wherein the image recognition engine comprises a new model generation unit in communication with the processor, the new model generation unit is configured to generate a new image recognition model based on the labelled super-classes of images for image recognition of inputted images.

16. The system as claimed in claim 11, wherein the image recognition engine comprises a model comparison and selection unit in communication with the processor, the model comparison and selection unit is configured to communicate with the threshold generation unit for decreasing the pre-determined threshold value for increasing the grouping of the one class of image with the other class of image in the multiple classes of images.

17. The system as claimed in claim 16, wherein the model comparison and selection unit is configured to communicate with the model generation unit and the new model generation unit for comparing the generated new image recognition model with respect to the base model for selecting a best image recognition model from the generated one or more new image recognition models.

18. The system as claimed in claim 11, wherein the image recognition engine comprises an image classification unit in communication with the processor, the image classification unit is configured to classify the super-classes of images into one or more sub-classes at least by one of: a sub-class image recognition model; and an image classification technique.

19. A computer program product comprising:
- a non-transitory computer-readable medium having computer program code store thereon, the computer-readable program code comprising instructions that, when executed by a processor, caused the processor to:
- extract one or more features from multiple classes of images for determining a correlation value between each of the multiple classes of images based on assessment of the extracted features of each one of the classes of images with respect to other classes of images in the multiple classes of images,
- wherein the correlation values are computed in a matrix form, and
- wherein the matrix comprises rows and columns equal to the number of image classes analyzed for determining the correlation values;
- group the one class of image with the other class of image in the multiple classes of images to form one or more groups of super-classes of similar class of images based on analysis of the determined correlation values with respect to a pre-determined threshold value; and
- recognize an input image based on the formed groups of super-classes followed by sub-class classification of the images.

* * * * *